March 3, 1959     K. E. SWANSON     2,875,690
INKING SYSTEM FOR ROTARY PRINTING PRESSES
Filed July 17, 1956
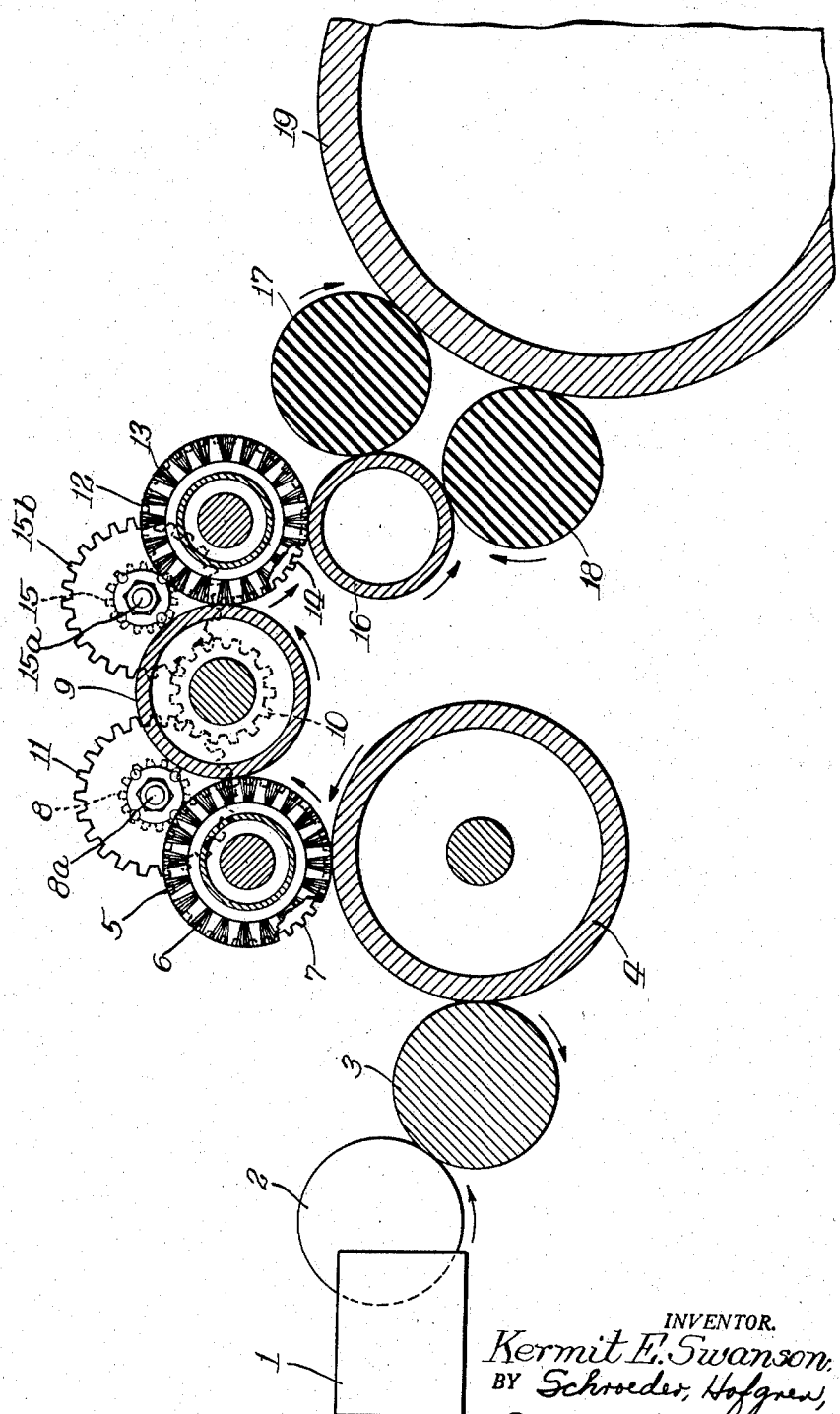
INVENTOR.
Kermit E. Swanson,
BY Schroeder, Hofgren,
Brady & Wegner
Atty's.

United States Patent Office 2,875,690
Patented Mar. 3, 1959

2,875,690

INKING SYSTEM FOR ROTARY PRINTING PRESSES

Kermit E. Swanson, Berwyn, Ill., assignor to R. R. Donnelley & Sons Company, a corporation of Delaware Application July 17, 1956, Serial No. 598,394

6 Claims. (Cl. 101—350)

This invention relates to an improved inking system for rotary printing presses, and in particular it relates to an inking system in which the frictional rubber idler rolls customarily used to transmit ink from one steel roll to the next are eliminated, and independently driven cylindrical brushes are used in their place.

A common inking system for rotary printing presses has a fountain roller which takes ink from an ink fountain and passes it to a ductor roller which, in turn, applies the ink to the surface of a steel distributing roll. A rubber roller in contact with the distributing roll picks up the ink and carries it along to a conveyor roll which ordinarily is axially reciprocated to spread the ink film. From this conveyor roll the ink is picked up by a second rubber surfaced roll and thence by another longitudinally reciprocating conveyor roll which, in turn, applies the ink to the form rolls which are in contact with the printing plates on the plate cylinder.

The operation of a conventional inking system as above described required that the steel conveyor rolls be driven at a surface speed of about 1,000 feet per minute with the rubber rolls driven off the steel rolls as idlers. There are certain inherent difficulties in the use of rubber rolls in a press inking system; and the substitution of rotary cylindrical brushes for the rubber rolls eliminates many of the more difficult problems.

In the first place, for proper ink distribution it is necessary for the rubber rolls to be adjusted so that they run with approximately a ⅜" flat surface in contact with the vibratory conveyor rolls. The surfaces of both rolls are, of course, coated with a highly viscous ink paste so that the relative movement between the axially reciprocating steel rolls and the non-reciprocating rubber rolls places tremendous tensile strains upon the rubber roll surfaces. Also, the mechanical working back and forth in the viscous ink surface generates a considerable amount of heat so that the rollers must have internal water pipes for cooling.

In spite of any cooling of the steel rolls, there is considerable expansion of the rollers due to heating as a press run progresses, and this necessitates the stopping of the run after a period of time to reset the rubber rolls so as to maintain the ⅜" flat area between the rubber roll and each vibratory roll.

All of the foregoing difficulties are largely eliminated by the use of rotary cylindrical brushes. The flexibility of the brush bristles makes it a great deal easier to adjust the brushes correctly with respect to the steel rolls; and there is, of course, an enormous reduction in the surface friction which reduces heating considerably. There is no need to reset the brush rolls after a period of operation, as is necessary with the rubber rolls.

Furthermore, the rubber rolls used for this purpose are necessarily tapered slightly toward the ends, so that it is difficult to maintain proper contact from end to end of the rubber rolls. Contrariwise, with cylindrical brushes it is not necessary to taper the brush surface in any way. This provides more uniform ink distribution from end to end of the steel rolls.

Two phenomena which are encountered in the use of ordinary inking equipment are "ghosting" and "starvation" of ink. When ghosting takes place, the impression of the printing plate is carried by the form roller back through the distributor rollers and produces an uneven ink surface so that subsequent impressions may not be uniform. Ink starvation is a non-uniform distribution of ink due to insufficient working between the rubber rolls and the vibratory steel rolls. A brush surface in place of the rubber surface greatly reduces the likelihood of ghosting and ink starvation.

Furthermore, on those occasions when the paper web breaks it is frequently carried by the viscous ink surface of the form roll back through the vibratory roll and the rubber rolls for some distance before the press can be stopped. Clearing such a "rewind" is greatly simpler with brush rolls than it is with rubber rolls.

Operating costs are reduced and rate of operation may be increased by the substitution of brush rolls for rubber rolls. The rubber roll surface may very well be peeled right off by the tremendous frictional forces set up in the viscous ink surface. Roll wear and roll damage are a major cost factor in the use of conventional inking systems using rubber rolls. These problems are also eliminated where brush rolls are used. Furthermore, the elimination of a considerable part of the frictional resistance means that less power is required to drive the inking system, so with the same motor a considerably higher press speed can be achieved.

For proper ink distribution with the use of brush rolls, it is necessary that the brushes be driven in such a way that their bristles sweep the surface of the steel rolls with which they are in contact. This may be accomplished by driving the brush rolls independently at a different rate of speed from the steel rolls, and preferably the brush rolls are driven in such a way that the movement of their bristles is opposite to that of the surfaces of the steel rolls with which they are in contact.

The accompanying drawing illustrates the invention diagrammatically, and in the drawing, the inking system includes an ink fountain 1, a fountain roll 2, a ductor roll 3, and a distributor roll 4. As illustrated, the ductor roll 3 is permanently in contact with the surfaces of the fountain roll 2 and distributor roll 4; but in accordance with common practice in the art the ductor roll may be reciprocated between the fountain roll and the distributor roll. In any event, the ink fountain 1, the fountain roll 2, and the ductor roll 3 constitute conventional means for applying ink to the distributor roll 4. In conventional practice with a reciprocating ductor roll, the fountain roll may be driven at 6 to 12 R. P. M., the ductor roll at 40 to 60 R. P. M., and the distributor roll at about 368 R. P. M.

In contact with the distributor roll 4 is a rotatable cylindrical brush 5 having parallel rows of radially extending tufts of bristles 6 which sweep the surface of the distributor roll 4. The cylindrical brush 5 may be driven by conventional means, such as a gear 7 on the brush shaft which meshes with a drive gear 8 on a shaft 8a. As shown by the arrows in the drawing, both the distributor roll 4 and the cylindrical brush 5 rotate counterclockwise so that the bristles 6 move counter to the direction of surface movement of the distributor roll 4. The cylindrical brush 5 is also driven at a substantially slower speed than the distributor roll 4; so that, for example, where the distributor roll is rotated at 368 R. P. M. the cylindrical brush may be rotated at 158 R. P. M.

Also in contact with the bristles 6 of the brush 5 is a conveyor roll 9 which has a steel surface and which is mounted so that it may be axially reciprocated, or vibrated. The shaft for the vibratory conveyor roll 9 is provided with a gear 10 which meshes with a drive gear 11 on shaft 8a by means of which the conveyor roll is also driven counterclockwise.

In contact with the conveyor roll 9 is a second cylindrical brush 12 having rows of tufts of bristles 13. The brush 12 is identical in construction with the brush 5 and the shaft upon which the brush is mounted is provided with a gear 14 which meshes with a drive gear 15 on a shaft 15a which is driven by a gear 15b meshing with conveyor roll gear 10 so that the brush 12 may also be driven counterclockwise so that bristles 13 also move counter to the surface movement of the conveyor roll 9. The bristles 13 of the brush 12 in turn are in contact with the steel surface of a second axially reciprocal conveyor roll 16 which, like the conveyor roll 9, is driven counterclockwise. Thus, each brush is flanked by a pair of rolls, and transfers ink from one to the other. In contact with the conveyor roll 16 is a pair of spaced form rolls 17 and 18 which are frictionally driven from the conveyor roll 16, and the surfaces of which are in contact with the printing surface of plates (not shown) mounted on a plate cylinder 19.

While the device is described as applied to a rotary press, it is obvious that this should be taken to include any press having a rotary printing element to which ink is applied, such as an offset or multicolor press.

The vibratory conveyor rolls 9 and 16 are preferably driven at about 706 R. P. M. and their axial reciprocation amounts to about an inch and a half.

The brush bristles 6 function as separate, radially extending elements which are flexible under circumferentially applied stresses, so that relative rotation between a brush roll and a conveyor or distributor roll with which it is in contact causes the bristles to sweep or scrub the surface of the roll contacted by them.

The sweeping, or scrubbing action of the bristles 6 and 13 on the surfaces of the steel rolls with which they are in contact provides a smoothness of ink distribution and a continuity of ink surface superior to anything which can be achieved using rubber rolls in the conventional manner.

The foregoing detailed description is given for clearness of understanding only and no unnecessary limitations should be understood therefrom, as modifications will be obvious to those skilled in the art.

I claim:

1. In an inking system for rotary printing presses, a first axially reciprocable conveyor roll, means for applying ink to said roll, a second axially reciprocable conveyor roll, a cylindrical brush having bristles in contact with both said rolls, roll drive means for rotating said rolls, vibratory means for axially reciprocating said rolls, and brush drive means for rotating said brush so that its bristles sweep the surfaces of both said rolls, and a form roll to receive ink from said second axially reciprocable roll.

2. The system of claim 1 in which the roll drive means rotates the two rolls in the same direction and the brush drive means rotates the brush so that its bristles move counter to the surface movement of said rolls.

3. In an inking system for rotary printing presses: a distributor roll; means for applying ink to said distributor roll; a form roll; an axially reciprocable roll from which ink passes to the form roll; means for rotating said rolls; and means for transmitting ink from said distributor roll to said reciprocable roll including at least one independently driven roller which has a discontinuous surface consisting of a mass of separate, closely spaced, generally radially extending elements which are flexible under circumferentially applied stresses, said elements sweeping the surface of the reciprocable roll to apply ink thereto.

4. In an inking system for rotary printing presses: a distributor roll; means for applying ink to said distributor roll; a form roll; an axially reciprocable roll from which ink passes to the form roll; means for rotating said rolls; and means for transmitting ink from said distributor roll to said axially reciprocable roll including at least one independently driven roller which has a discontinuous surface consisting of a mass of separate, closely spaced, generally radially extending elements which are flexible under circumferentially applied stresses, said elements sweeping the surfaces of two flanking rolls to receive ink from one of said rolls and apply it to the other of said rolls.

5. In an inking system for rotary printing presses: a distributor roll; means for applying ink to said distributor roll; a form roll; an axially reciprocable roll from which ink passes to the form roll; means for rotating said rolls; and means for transmitting ink from said distributor roll to said reciprocable roll including at least one independently driven cylindrical brush having bristles which sweep the surface of the reciprocable roll to apply ink thereto.

6. In an inking system for rotary printing presses: a form roll; an axially reciprocable roll in contact with said form roll; means for rotating both said rolls; an independently driven cylindrical brush having bristles which sweep the surface of the reciprocable roll; rotating roll means continuously in contact with said brush; and means for applying ink to said roll means for transfer by said brush and said reciprocable roll to the form roll.

References Cited in the file of this patent

UNITED STATES PATENTS 1,983,987    Morriston et al.         Dec. 11, 1934

FOREIGN PATENTS 563,555    Germany               Nov. 8, 1932